Figure 1:
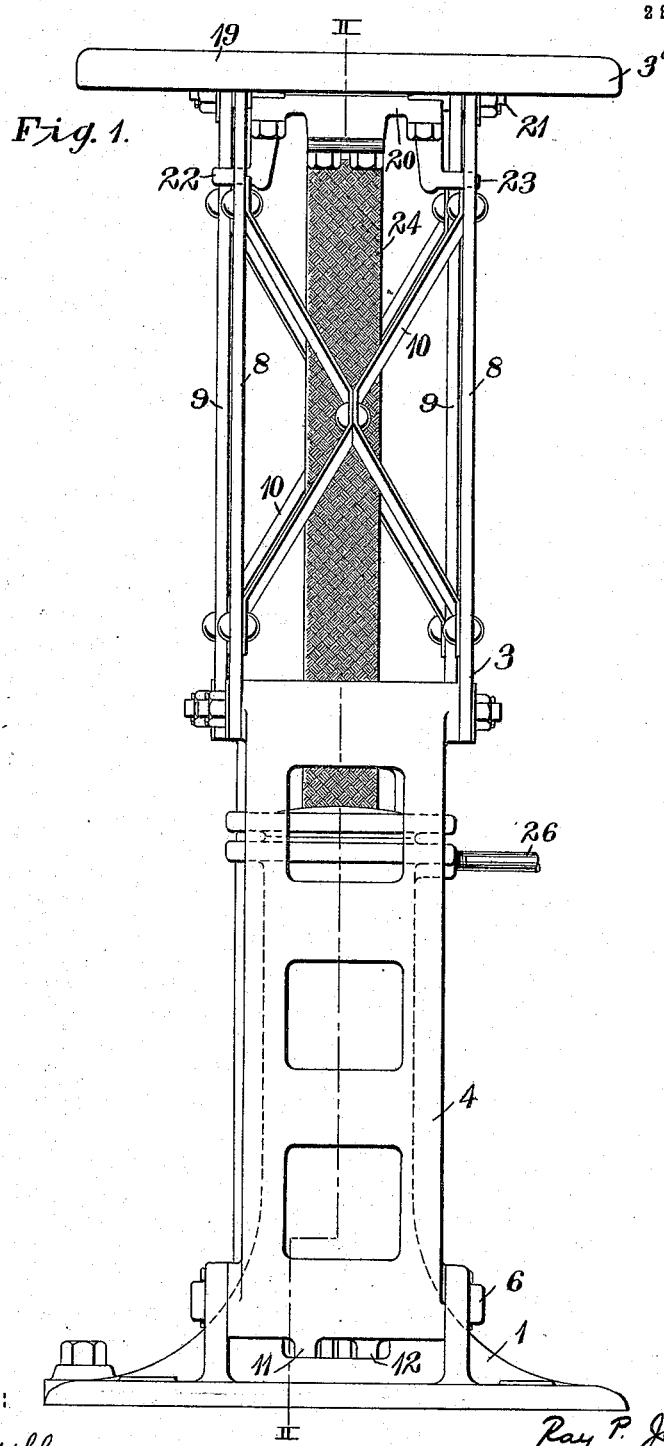

R. P. JACKSON & C. AALBORG.
TROLLEY.
APPLICATION FILED APR. 28, 1906.

932,554.

Patented Aug. 31, 1909.
2 SHEETS—SHEET 1.

WITNESSES:
Fred H. Miller
R. P. Dearborn.

INVENTORS
Ray P. Jackson
& Christian Aalborg
BY
Wesley G. Carr
ATTORNEY

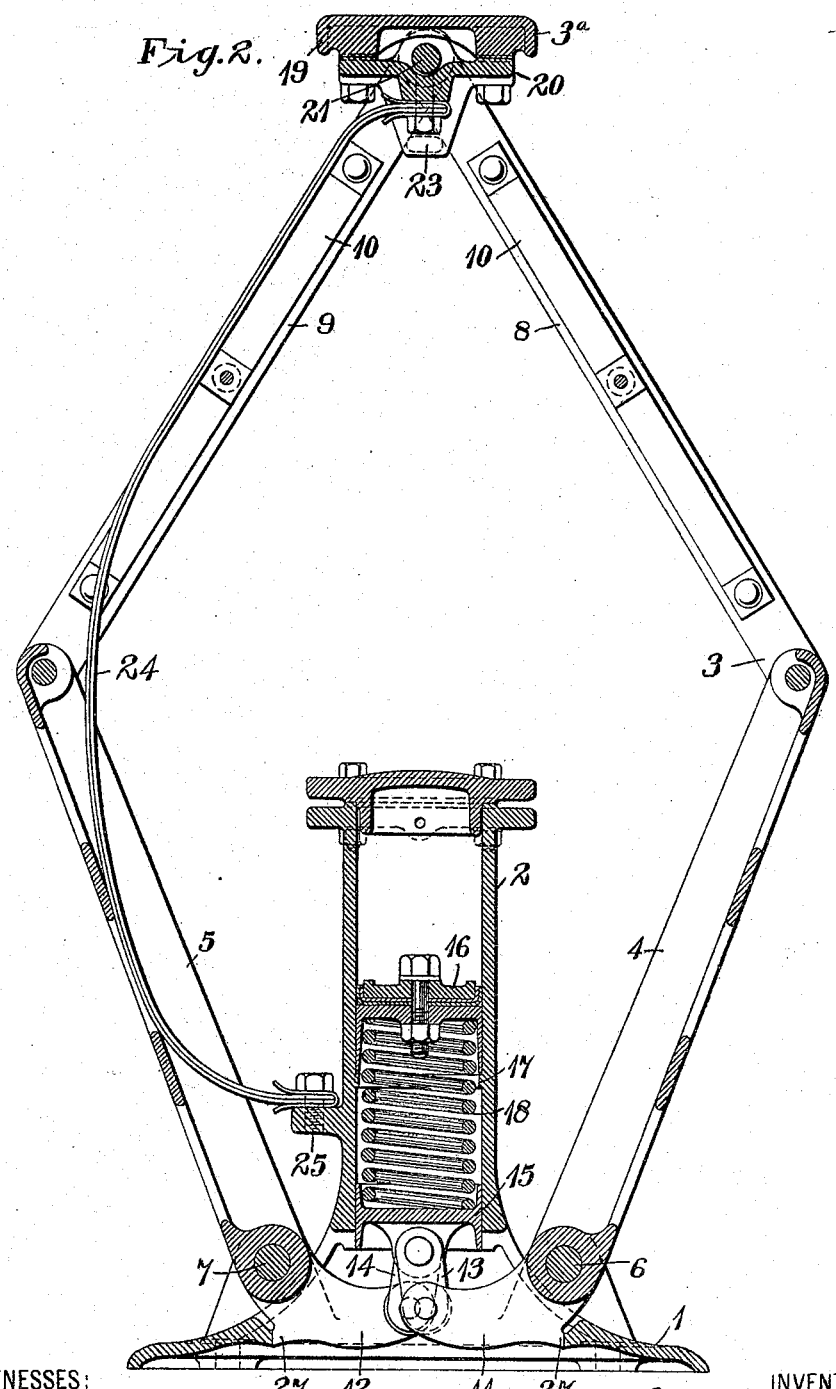

UNITED STATES PATENT OFFICE.

RAY P. JACKSON AND CHRISTIAN AALBORG, OF WILKINSBURG, PENNSYLVANIA, ASSIGNORS TO WESTINGHOUSE ELECTRIC & MANUFACTURING COMPANY, A CORPORATION OF PENNSYLVANIA.

TROLLEY.

932,554.           Specification of Letters Patent.     Patented Aug. 31, 1909.

Application filed April 28, 1906. Serial No. 314,208.

*To all whom it may concern:*

Be it known that we, RAY P. JACKSON and CHRISTIAN AALBORG, citizens of the United States, and residents of Wilkinsburg, in the county of Allegheny and State of Pennsylvania, have invented a new and useful Improvement in Trolleys, of which the following is a specification.

Our invention relates to current-collectors for electric vehicles and has special reference to trolleys having a pantograph or lazytongs structure.

The object of our invention is to provide an improved trolley structure of the type above indicated that shall be simple and durable and that shall be specially adapted for collecting relatively large currents and for operation in connection with overhead rail conductors.

In some sections of track which are traversed by electric locomotives or other vehicles normally receiving their energy from a third rail that is substantially on a level with the track rails, it is desirable to supply current from an overhead rail conductor. These sections may include tunnels or grade crossings and are usually relatively short so that the current-collecting device employed may advantageously be controlled from the interior of the vehicle, pneumatic or other suitable means being employed for raising and lowering the contact member.

According to our present invention the contact shoe is raised by admission of fluid-pressure to an operating cylinder and is lowered by gravity when fluid-pressure is exhausted from the cylinder. The pantograph or lazytongs structure to which a contact shoe is attached is connected by suitable links to a guide piston, and a suitable spring is interposed between the guide piston and a main operating piston which is actuated by fluid-pressure. By regulating the fluid-pressure in the cylinder, a certain amount of resiliency might be given to the structure but the contact shoe more readily follows any irregularities or variations in the overhead rail conductor, without involving the possibility of entire separation therefrom, when the fluid-pressure is employed only for raising and lowering the shoe and when another resilient means is provided between the operating piston and the lazytongs structure.

Our invention is illustrated in the accompanying drawings in which—

Figure 1 is a front elevation and Fig. 2 is a sectional elevation on line II—II of Fig. 1, of a trolley constructed in accordance therewith.

Referring to the drawings, the trolley comprises a stationary frame 1 which may be mounted upon the roof of an electric vehicle, a stationary cylinder 2, a double lazytongs or pantograph frame structure 3 and a contact shoe 3$^a$.

The lazytongs structure 3 comprises two similar channel beams 4 and 5 fulcrumed upon stationary shafts 6 and 7 which are supported from the frame 1, and two pair of links 8 and 9 the lower ends of which are pivotally connected to the upper extremities of the channel beams 4 and 5 and the upper ends of which are pivotally connected together and to the contact shoe 3$^a$. The links 8 and the links 9 are each interconnected by cross stays 10 which may be riveted or otherwise suitably attached thereto. The stationary shafts 6 and 7 are separated by a material distance and the channel beams 4 and 5 are provided with arms 11 and 12 which extend toward each other in parallel planes and are connected by links 13 and 14, to a guide piston 15 which is free to operate within the cylinder 2. The cylinder 2 is also provided with a piston 16 which operates in the upper or closed end of the cylinder and which is limited in its downward motion by an annular projection 17 on the inner surface of the cylinder, and a helical spring 18 is interposed between the guide piston 15 and the piston 16.

The shoe 3ª comprises a sliding contact plate 19 and a bearing member 20 that is attached thereto and supports the shaft or bolt 21 the ends of which project through holes located in the upper extremities of the links 8 and 9. The bearing member 20 is further provided with projections 22 and 23 which extend outwardly between the links 8 and 9 and serve to center the contact shoe when it is raised against a supply conductor.

In order to improve the electrical connection between the shoe and the stationary frame, a flexible conductor 24 is bolted to the bearing member 20 at one end and is similarly attached to a projection 25 on the cylinder 2 at its other extremity. The weight of the shoe and the pantograph structure is sufficient to keep the trolley normally in its lowered or collapsed position and when it is desirable to raise the shoe into contact with the overhead conductor, fluid-pressure may be admitted to the upper end of the cylinder 2 above the piston 16 through a pipe 26, whereupon this piston is forced against the annular projection 17 and the pantograph structure is extended by the downward pressure exerted, through the links 13 and 14 upon the arms 11 and 12, by the intermediate spring 18. The upward motion of the contact shoe is limited by shoulders 27 on the arms 11 and 12 which are adapted to engage projections on the frame 1. In this way, the piston 16 is firmly held against the annular projection 17 on the inside of the cylinder and the contact shoe is permitted to follow the irregularities in the conductor which it engages by reason of the spring 18.

We claim as our invention:

1. In a trolley, the combination with a lazy-tongs structure, a contact shoe and a fluid-pressure cylinder, of two piston heads and an interposed spring in the cylinder, and connections between one of the piston heads and the lazy-tongs structure.

2. In a trolley, the combination with a lazy-tongs structure, a contact shoe and a fluid-pressure cylinder, of two piston heads and an interposed spring in said cylinder, and link and lever connections between one of the piston heads and the lazy-tongs structure.

3. In a trolley, the combination with a lazy-tongs structure, a contact shoe and a fluid-pressure cylinder, of a piston head, limit stops for the piston head, a second piston head, a spring interposed between the two piston heads and connections between the lazy-tongs structure and the second piston head.

4. In a trolley, the combination with a lazytongs structure, a contact shoe and a stationary fluid-pressure cylinder having an open end, and a flexible conductor which connects the shoe and the cylinder together, of a piston head adapted to operate within the cylinder, limit stops which determine the stroke of said piston head, a second piston head adapted to operate in the cylinder adjacent to its open end, a spring interposed between said piston heads, and means for connecting the second piston head to the lazytongs structure.

5. In a trolley, the combination with a lazytongs structure, a contact shoe and a stationary fluid-pressure cylinder, one end of which is open, and a flexible conductor which connects the shoe and the cylinder together, of a piston head adapted to operate within the cylinder, an annular projection on the inside of the cylinder to limit the stroke of said piston head, a second piston head adapted to operate in the cylinder adjacent to its open end, a spring interposed between said piston heads, and means for connecting the second piston head to the lazytongs structure.

6. In a trolley, the combination with a lazytongs structure, a contact shoe, a fluid-pressure cylinder for raising and lowering the shoe, and means for centering the shoe as it is raised, of two piston heads and an interposed spring within said cylinder, and connections between one of said piston heads and the lazytongs structure.

7. In a trolley, the combination with a lazytongs structure, a contact shoe pivotally mounted at the upper extremity of the structure, projections which extend between the relatively movable arms of the lazytongs structure and serve to center the shoe as it is raised, a stationary fluid-pressure cylinder and a flexible conductor which electrically connects the shoe and the cylinder together, of a piston head adapted to operate within the cylinder, limit stops which determine the stroke of said piston head, a second piston head adapted to operate in the cylinder adjacent to its open end, a spring interposed between said piston heads and means for connecting the guide piston head to the lazytongs structure.

8. In a trolley, the combination with a lazytongs structure, a contact shoe pivotally mounted at the upper extremity of the structure, projections which extend between the relatively movable arms of the lazytongs structure and serve to center the shoe as it is raised, a stationary fluid-pressure cylinder and a flexible conductor which electrically connects the shoe and the cylinder together, of a piston head adapted to operate within the cylinder, an annular projection on the inside of the cylinder to limit the stroke of said piston head, a second piston head adapted to operate in the cylinder adjacent to its open end, a spring interposed between said piston heads and means for connecting the guide piston head to the lazy-tongs structure.

9. A railway vehicle trolley, comprising a vertical cylinder, two piston heads and an interposed spring within said cylinder, means for introducing fluid-pressure above the upper piston head, a pantograph structure connected to the lower piston head and a contact shoe pivotally supported upon the upper end of said pantograph structure.

In testimony whereof, we have hereunto subscribed our names this 27th day of April, 1906.

RAY P. JACKSON.
CHRISTIAN AALBORG.

Witnesses as to the signature of Ray P. Jackson:
CURTIS A. TUCKER,
BIRNEY HINES.

Witnesses as to the signature of Christian Aalborg:
FRANK CONRAD,
BIRNEY HINES.